April 8, 1947.  G. C. SHIPLEY  2,418,485
GUM MASSAGER
Filed Aug. 11, 1945

GEORGE C. SHIPLEY
INVENTOR.

BY Lester B. Clark
Ray L. Smith
ATTORNEYS.

Patented Apr. 8, 1947

2,418,485

UNITED STATES PATENT OFFICE 2,418,485

GUM MASSAGER

George C. Shipley, Galveston, Tex., assignor of twelve and one-half per cent to Alfred M. Gerdes, Galveston, Tex., and twelve and one-half per cent to Raymond R. Hendrickson, Galveston County, Tex.

Application August 11, 1945, Serial No. 610,300

5 Claims. (Cl. 128—62.1)

This invention relates to a gum massaging device, and more particularly to a device of this type that may be removably positioned upon a conventional tooth brush and which is so constructed that it may be used upon brushes having bristled areas of different sizes.

It is the primary object of the invention to provide a massager that is simple and inexpensive, and which may be installed upon a tooth brush for use therewith.

Another object is to provide a gum massager that may be installed upon tooth brushes having bristled areas of different sizes.

Still another object is to provide a massager of resilient material, and of such configuration that it will fit upon and frictionally engage the handle portion of a tooth brush and thus remain thereon during use.

Another and more specific object is to provide a massager including a body portion having a massaging area thereon and a portion extending outwardly from such area and including means for selectively engaging the handle of a tooth brush whereby the massager may be installed upon tooth brushes having bristled areas of different sizes.

It is also an object to provide a massager comprising a body of resilient material having a massaging area or surface thereon, and a plurality of spaced restricted openings adapted to be selectively enlarged to receive and engage a tooth brush handle, and hence to be removably mounted upon any of various tooth brushes.

The foregoing objects together with other objects and advantages will be more fully apparent from the following description considered in connection with the accompanying drawings in which.

Figure 1:
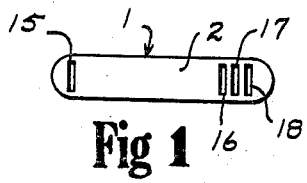
Fig. 1 is a top plan view of one embodiment of the invention.
Figure 2:
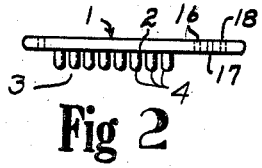
Fig. 2 is a side elevational view of the device shown in Fig. 1.

In the drawings a massager embodying the invention is shown at 1 as comprising a strip 2 of resilient material such as rubber and the like, such body being provided with a massaging area shown at 3 as comprising a plurality of resilient projections 4. It is to be understood that the area 3 may have any suitable contour deemed desirable to serve as a massaging area or surface.

Figure 4:
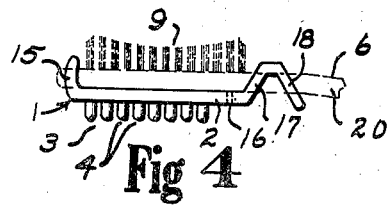
Figs. 4 and 5 are side elevational views similar to that shown in Fig. 3, but showing the manner of mounting the device upon tooth brushes having bristled areas of increasingly greater lengths.
Figure 5:
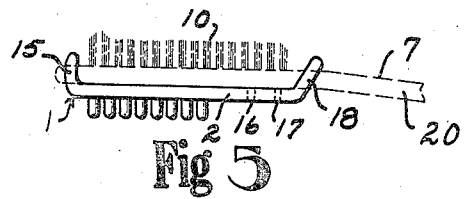

An important feature of the invention resides in the structure whereby the device may be releasably mounted upon a tooth brush, and is so constructed that the distance between the points of attachment may be varied and in this manner the device may be used upon brushes having bristled areas of different lengths. This feature is shown by reference to brushes 5, 6 and 7 having bristled areas 8, 9 and 10 as shown in Figs. 3, 4 and 5.

To accomplish the purpose just indicated suitable means such as the opening 15 is provided at the end of the body 1 adjacent the area 3, such opening serving as means for securing the outer end of the body to the outer end of the tooth brush handle. At the inner end of the area 3 there is provided a series of spaced openings shown as three in number, as indicated at 16, 17 and 18. It is intended that the structure thus far described, and of which the manner of application will be more fully explained, shall be releasably engageable with the handle of a tooth brush at spaced points at opposite ends of the bristled area thereof, and that the intervening portion shall be held in close contiguity with the back of the brush handle opposite the bristles shown at 8, 9 and 10.

Attention is directed to the fact that the respective openings 15 to 18 inclusive are of a restricted size. That is to say, these openings shall be of such size that resilient enlargement thereof is necessary in order for the tooth brush handle to pass through the respective openings. By virtue of this fact the material of the body 2 will resiliently and frictionally engage the tooth brush handle and hold the device in place. At the same time removability of the device is afforded and it may be installed upon tooth brushes having bristled areas of different lengths.

Figure 3:
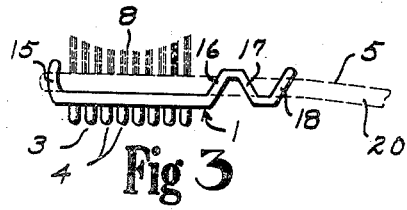
Fig. 3 is a side elevational view showing the device installed upon a tooth brush having a short bristled area thereon.

The installation of the device upon a brush having a small bristled area 8 is shown in Fig. 3. To effect this installation the handle 20 is first introduced through the opening 16 from the upper to the lower side of the body 2. The handle is then passed through the opening 17 in the opposite direction and finally through the opening 18 in the same direction as for the opening 16. The device is next moved along the handle until the portion containing the openings 16, 17 and 18 reaches the position shown in Fig. 3. Thereupon the opposite end of the device is moved arcuately upward to bring the body 2 into engagement with the back of the brush handle opposite the bristled area 8. The opening 15 is then expanded to fit over the outer end of the handle 20 to complete the installation of the device upon the brush 5.

The installation of the device upon a brush having a longer bristle area as indicated at 9 in Fig. 4, is carried out in a manner just described except that the opening 16 is not used. Accordingly the handle 20 passes through openings 17 and 18 only, and in this manner the distance between the points of engagement of the device with the handle 20 is increased to accommodate the longer bristled area 9.

For a still longer bristled area as indicated at 10 in Fig. 5, the handle 20 passes through the opening 18 only and in this manner the increased length of the bristled area is accommodated.

While the drawings show, and the foregoing description explains the use of the invention on brushes having three different sizes of bristled areas, it is to be understood that the invention is applicable for use upon any of the various sizes of brushes currently available in the market. Broadly the invention comprehends a gum massaging device having the parts thereof so constructed and arranged that it may be readily and replaceably installed upon tooth brushes having bristled areas of different lengths.

What is claimed is:

1. A gum massager adapted to be removably attached to a toothbrush to provide a massaging surface upon the toothbrush opposite the bristled area thereon comprising, a body formed of resilient material and having a massaging surface thereon, spaced means at one end of said body for selective engagement with a toothbrush handle at the inner end of the bristled area on the brush, and means on the opposite end of the body for engagement with the outer end of the toothbrush handle whereby the body is held in position thereon.

2. A gum massager adapted to be removably attached to a toothbrush to provide a massaging surface on the toothbrush opposite the bristled area thereon comprising, a body formed of resilient material and having a massaging surface thereon, spaced means at one end of said body for selective engagement with a toothbrush handle at the inner end of the bristled area on the brush, and means on the opposite end of the body for engagement with the outer end of the toothbrush handle whereby the body is held in position thereon, at least one of said means comprising a restricted opening to be resiliently enlarged to fit upon and have frictional engagement with the toothbrush handle.

3. A gum massager adapted to be removably attached to a toothbrush to provide a massaging surface upon the toothbrush opposite the bristled area thereon comprising, a body formed of resilient material and having a massaging surface thereon, spaced means at one end of said body for selective engagement with a toothbrush handle at the inner end of the bristled area on the brush, and means on the opposite end of the body for engagement with the outer end of the toothbrush handle whereby the body is held in position thereon, said spaced means comprising spaced resilient openings to selectively receive the toothbrush handle so that the points of engagement of the body with the handle is adjustable.

4. A gum massager for attachment to a toothbrush to provide a massaging surface opposite the bristled area thereof comprising, a body formed of resilient material and having a massaging surface thereon, a plurality of spaced openings outwardly of one end of said surface, said openings being of restricted size for resilient enlargement to receive the handle of a toothbrush and adapted to be passed selectively over the handle, and means on said body opposite said openings for engaging the handle, whereby the body may be secured upon brushes having bristled areas of different lengths.

5. A gum massager comprising, a body formed of a strip of resilient material having a massaging area on one surface thereof, said body extending outwardly from one end of said area and having a plurality of spaced openings adapted to be selectively, resiliently enlarged to receive and engage the handle of a toothbrush at different distances from the massaging area, and means at the opposite end of the massaging area for engaging the outer end of the toothbrush handle, whereby the body is removably held in position upon the handle of a toothbrush with the massaging area opposite the bristled area of the brush.

GEORGE C. SHIPLEY.